Figures 1, 2, 3, 4, 5, 6:
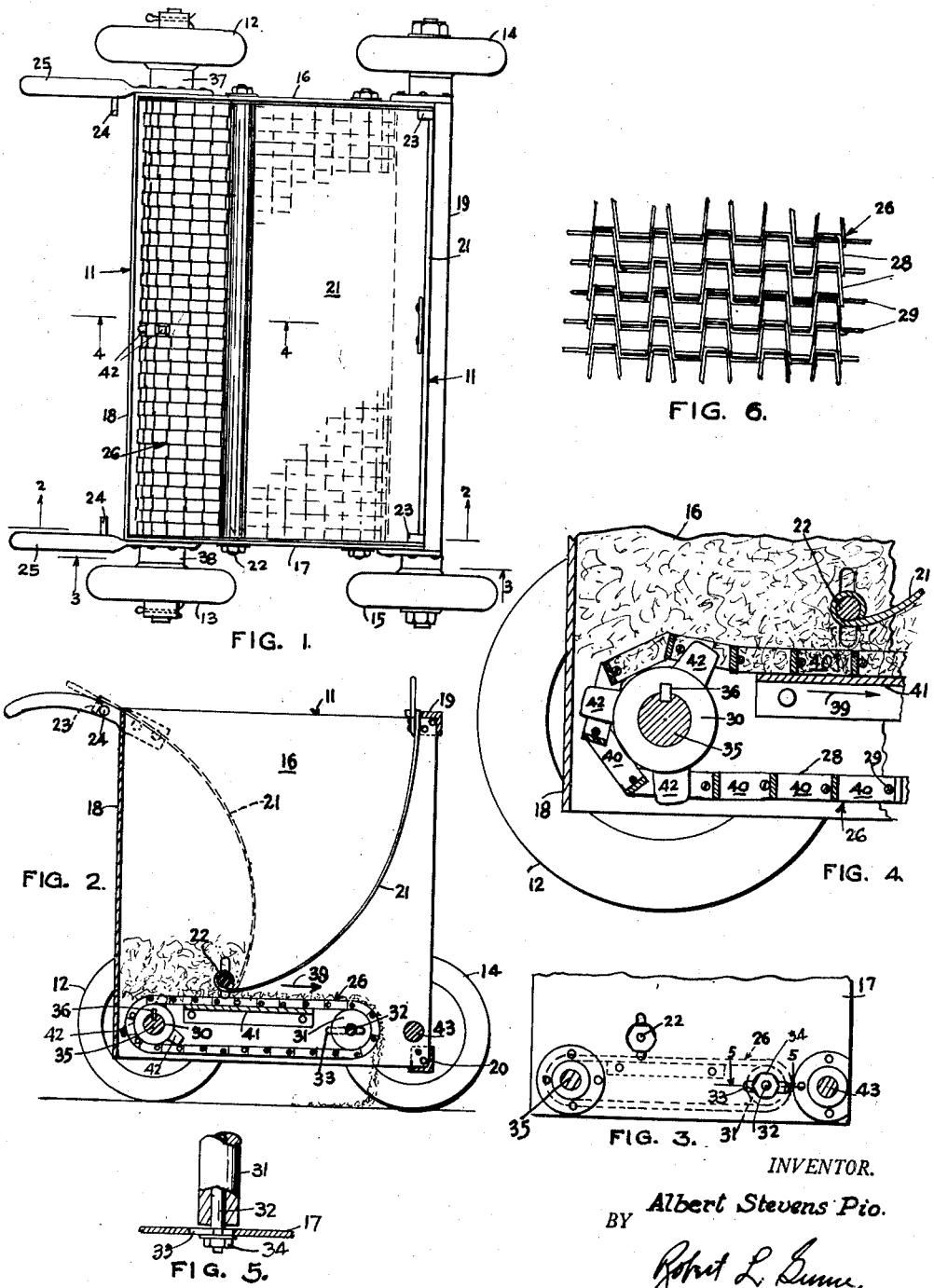

March 12, 1957  A. S. PIO  2,784,880
MACHINE FOR SPREADING PEAT MOSS AND THE LIKE
Filed July 12, 1954

INVENTOR.
Albert Stevens Pio.
BY
ATTORNEY.

United States Patent Office 2,784,880
Patented Mar. 12, 1957

2,784,880

MACHINE FOR SPREADING PEAT MOSS AND THE LIKE

Albert Stevens Pio, Gilroy, Calif.

Application July 12, 1954, Serial No. 442,529

3 Claims. (Cl. 222—177)

This invention relates to agricultural implements and deals particularly with an apparatus for spreading soil conditioning materials, such as peat moss, or the like.

The invention to be hereinafter described has been shown and explained as a small hand cart embodying the novel parts of my invention adapted to spread peat moss, but it may equally as well be illustrated as a larger unit employing mechanical power adapted to spread any soil conditioner similar to peat moss.

In spreading peat moss, it has been found that the particular formation of the moss, consisting of long stringers and interlaced fibers, does not lend itself readily to mechanical spreading. As a result, most of the spreading has been done by hand. But even in hand spreading there is no uniformity of distribution of the moss, furthermore, it is slow and costly. It is therefore, the principal object of my invention to provide means whereby peat moss may be spread mechanically over the soil to be treated.

To those skilled in the art of soil treatment, and particularly those who have spread peat moss or the like, it is known that soil conditioners of this type must be spread uniformly to be most effective. In my invention I provide mechanical means whereby the moss is not only shredded and broken into small pieces, but is also distributed over the surface of the soil in a uniform layer. I have also discovered means for controlling the thickness of the layer distributed, and in addition, have incorporated means for insuring equal distribution according to the adjustment made.

Briefly stated, my invention amounts to using a metal conveyor belt having straight sided pockets formed therein by the mechanical arrangement of the links of the belt, which serve to collect and draw the peat moss under a straight edge parallel to the surface of the belt and closely adjacent thereto to perform a shredding and a shearing action on the peat moss. The belt not only performs the function of pulling the moss under the straight edge, but also serves to carry the pieces of broken moss forward and over a roller where it is dumped on the soil. All this action takes place inside a bin on wheels where the moss is protected from wind and random scattering. In addition, I have found that a certain amount of pressure is necessary to press the moss against the belt so that enough moss will be pushed into the pockets and pulled under the shredding and shearing member to insure a proper spread. My invention also provides adjustable means for this purpose.

Another object of my invention is to provide a small wagon or cart, which may be operated either by hand or power, to spread peat moss or the like, and one which is durable, inexpensive, easy to manufacture, and lends itself readily to use for spreading several different types of soil conditioners.

Other objects and advantages will become apparent as the description proceeds in conjunction with the drawing in which:

Figure 1 is a top plan view of my invention;
Figure 2 is a section taken on line 2—2 of Figure 1;
Figure 3 is a section taken on line 3—3 of Figure 1;
Figure 4 is an enlarged section taken on line 4—4 of Figure 1;
Figure 5 is a section taken on line 5—5 of Figure 3; and
Figure 6 is a view showing a fragmentary section of the type of belt suitable for my invention.

Referring to the drawing and particularly to Figures 1 and 2, it will be seen that my invention comprises, in general, a body or bin 11, mounted on wheels 12, 13, 14, and 15. In the illustration, the whole is adapted to be pushed over the ground by hand, but as before stated, it may be equipped with power and may be made larger or smaller as dictated by need or desire.

In Figure 2, I have shown a cross section of the wagon or cart which embodies my invention. Taking up more specifically the parts enumerated in Figures 1 and 2, it can be seen here that the bin or body 11 consists of end walls 16 and 17 held together by a back wall 18. These members form three walls of a bin and the fourth member or the front side of the bin consists of means for holding the two end members in spaced position so that a movable wall may be operated as the front wall. For this purpose, I use two cross members 19 and 20 which take the form of angle irons attached to the front corners of the end members. The bin has no bottom except that provided by my invention. As stated above, it has a movable front wall 21, which is a part of my invention, pivotally mounted on a rod 22 fixed in the end members 16 and 17. The wall 21 may be curved in the shape shown to provide a downwardly pressing action on the contents of the bin when it is pulled backward toward the rear wall 18, as shown in the dotted lines of Figure 2. It may be locked in this position by engaging the lug 23 on the upper edge of the wall member 21, over the pin 24, extending from the handle 25 which in turn is mounted on the end members. There are two lugs, one on each end of the wall 21 and two pins, one on each handle, so that when the wall 21 is locked in position, it will tend to exert a compressing action on the contents of the bin and will force the peat moss, or other contents of the bin, as the case may be, down onto the conveying means in the bottom of the bin. Figure 2 shows how this action takes place.

In the lower part of the bin I mount the means for shredding and tearing the peat moss into particles or pieces that are suitable for distribution over the soil. In experimenting, I discovered that peat moss, and similar materials, required an unusual means for distribution. I found that the combination of a particular type of conveyor belt with a shearing member would perform the type of shearing, shredding, and conveying action I needed. Broadly speaking, the belt should have a series of pockets large enough to hold a substantial amount of material to be distributed, and these pockets should have more or less straight sided walls that will tend to hold the material against sliding out of the pockets when a pulling action takes place. In use, the pockets fill up with the material in the bin and the belt is drawn forward under a straight edge where it is torn and shredded into smaller pieces that are carried forward by the belt and dumped over a forward roller onto the ground. More specifically, the means for this purpose consists of an endless conveyor belt generally designated 26, best shown in Figure 2, mounted in the lower part of the bin 11. One type of belt suitable for my purpose is shown in Figure 6. This particular belt is articulated in such a manner that a series of pockets defined by straight metallic walls is formed within the belt. The belt itself, is formed of a plurality of members 28, which in this case are identical, pivotally connected by cross rods 29. The width of the belt should be substantially the same as the width of the bin, as shown in Figure 1. The belt works over rollers 30 and 31 in the lower part of the bin 11. The roller 31 is rotatably mounted on rod 32, which in turn is adjustably mounted in the end walls 16 and 17 by a construction similar to that shown in Figure 5. In this view, it can be seen that the rod is reduced at the end to pass through a slot 33 in the end wall 17. In practice, both ends of the rod would be treated the same. The outer end of the reduced portion may be threaded to take a nut 34 which is used to clamp the rod in the slot and provide means for adjustably positioning the rod in the slot. The purpose of this construction will become apparent later in relation to the operation of the belt 26. The belt 26, as stated above, is mounted on the rollers 30 and 31, and while the roller 31 is an idling roller, the roller 30 is the driving roller for moving the belt. For this reason, the roller 30 is fixed to a rod 35 by means of a key 36, or any other suitable means. The rod 35, in turn, is rotatably carried in bearings 37 and 38 mounted on the end walls 16 and 17 respectively. The wheels 12 and 13, previously mentioned, are fixed to opposite ends of the rod 35 so as to turn the rod when the cart is pushed over the ground. Under this arrangement, the belt 26 will travel in the direction of the arrow 39 as the cart is moved forwardly.

In Figure 4 I have shown an enlarged view of the belt construction. Here, the action of the belt and the pockets in the belt can be seen more clearly. As seen here, the belt embodies a series of pockets 40 formed by the interconnecting parts of the conveyor belt 26, and as these pockets move forwardly under the drive of the roller 35, they carry the material collected therein under the lower edge of the front wall 21, which forms the straight edge mentioned before and force the material through a slot formed between the straight edge and the top of the conveyor belt. The material in the pockets sets up a dragging action on the material in the lower part of the bin and forces it to follow the belt through the slot, thereby shredding and shearing it into small pieces suitable for spreading. These pieces are carried forward on the belt and deposited on the ground as the belt passes over the roller 31. It might be stated here, that as the material in the bin grows less in bulk and weight, it can be pressed downwardly against the belt by pulling the forward wall 21 rearwardly against the rear wall and locking it there as before explained. To prevent the shredded material falling through the belt before it is properly treated, I incorporate a plate or shell 41 directly beneath the belt which extends from end to end of the bin and is attached to the end walls, in any suitable manner.

Also in driving the real roller 30, I take advantage of the belt construction and move it by pins 42 spacedly mounted in a circumference of the roller so that they will engage predetermined pockets in the roller and move the chain belt similar to a sprocket and chain drive. Usually one set of pins placed near the center of the roller is sufficient. More may be used if found necessary or desirable.

The rod 22 and the rod 32 are adjustable mounted in the end walls 16 and 17 in any suitable manner such as shown in Figure 5. The adjustment of the rods is for the purpose of gauging the amount of material pulled through the machine under the straight edge as well as to control and regulate the fineness of the shredding operation. By increasing the width of the slot, it is obvious that more material will be pulled through and that the pieces of material will be larger. The adjustment of the rod 32 is to tighten the belt over the rollers 30 and 31.

The front wheels 14 and 15, as shown, are mounted on a shaft 43 extending through the walls 16 and 17. In this arrangement they are not dirigible, but if desired they could easily be mounted on caster pivots and provide a dirigible cart.

In operation, the cart is pushed over the surface of the soil to be treated. This, as stated before, may be done by hand or by power, and the peat moss, or whatever material is being spread will be drawn from the lower part of the bin and deposited on the ground. The apparatus will spread only while travelling and will find usefulness in gardens, small truck farms, and wherever there is need for soil conditioners such as peat moss, or the like.

Although I have shown and described my invention in connection with peat moss, it is to be understood that the invention is not to be restricted to this particular material since it will work equally as well with other materials, and also, that such modifications, alterations, and refinements as come within the disclosure and the scope of the claims are intended to be included herein.

I claim:

1. An apparatus for spreading peat moss or the like, comprising; a bin adapted to contain peat moss mounted on wheels for movement over the surface of the soil to be treated, a conveyor belt operably mounted in the lower part of said bin, said belt having a plurality of pockets therein with substantially straight sided walls, means for moving said belt in said bin to eject pieces of peat moss therefrom by movement of the bin over the surface of the soil, and means for pressing said peat moss onto the surface of said belt to engage said pockets, said last mentioned means comprising a swingable wall of said bin pivotally mounted in said bin on the lower edge thereof arranged to exert a pressure on said moss tending to press the moss into the pockets of said belt as the wall member is moved on its pivot.

2. The elements of claim 1 and in combination therewith, means for locking said pivotal wall in position to exert pressure on said peat moss.

3. An apparatus for spreading peat moss or the like comprising: a bin adapted to contain peat moss mounted on wheels for movement over the surface of soil to be treated, a conveyor belt operably mounted in the lower part of said bin, said belt having pockets therein adapted to engage and receive peat moss and evert a dragging action on said moss as the belt is moved in said bin, a straight edge adjacent said belt and substantially parallel therewith adapted to engage said peat moss and reduce it to smaller pieces as it is pulled between the belt and the straight edge, means operable by the movement of said bin on its wheels to move said belt relative to said straight edge, and means for pressing said peat moss onto the surface of said belt.

References Cited in the file of this patent

UNITED STATES PATENTS

| 22,273 | Keifer et al. | Aug. 24, 1858 |
| 146,288 | Smallwood | Jan. 6, 1874 |
| 1,772,423 | Hurxthal | Aug. 5, 1930 |
| 1,907,637 | Woodman | May 9, 1933 |
| 1,977,513 | Holbeck | Oct. 16, 1934 |
| 2,036,522 | Armstrong | Apr. 7, 1936 |

FOREIGN PATENTS

| 278,899 | Great Britain | Oct. 20, 1927 |
| 44,831 | Denmark | Oct. 31, 1931 |